United States Patent [19]
Miloscia et al.

[11] 3,891,722
[45] June 24, 1975

[54] PROCESS FOR MANUFACTURE OF IMPACT-RESISTANT POLYMERIZATES OF OLEFINIC NITRILES AND DIENE RUBBERS

[75] Inventors: William J. Miloscia, Macedonia; John J. Weisz, Solon; Paul E. Planz, North Randall, all of Ohio

[73] Assignee: Standard Oil Company, Cleveland, Ohio

[22] Filed: Feb. 16, 1970

[21] Appl. No.: 11,924

[52] U.S. Cl. .............................. 260/879; 260/679
[51] Int. Cl. ..................... C08f 15/36; C08f 15/40
[58] Field of Search ................................... 260/879

[56] References Cited
UNITED STATES PATENTS 3,426,102  2/1969  Solak et al. ...................... 260/879
3,428,712  2/1969  Carrock et al. .................... 260/880

Primary Examiner—Joseph L. Schofer
Assistant Examiner—William F. Hamrock
Attorney, Agent, or Firm—John F. Jones; Sherman J. Kemmer

[57] ABSTRACT

Impact-resistant polymers having low permeability to gases and vapors are prepared by polymerizing an olefinic nitrile, such as acrylonitrile, optionally with an olefinic ester, such as ethyl acrylate, or a monoolefin, such as isobutylene, in an aqueous medium in the presence of a diene rubber using a delayed addition of polymer modifier to the polymerization medium.

5 Claims, No Drawings

PROCESS FOR MANUFACTURE OF IMPACT-RESISTANT POLYMERIZATION OF OLEFINIC NITRILES AND DIENE RUBBERS

The present invention relates to an improved method for preparing polymeric compositions having high impact strength and low permeability to gases and vapors, and more particularly pertains to a polymerization process for preparing resinous interpolymers having improved impact resistance composed of a conjugated diene monomer, an olefinically unsaturated nitrile, and either an ester of an olefinically unsaturated carboxylic acid or a monoolefin in which polymer modifier is added to the polymerization medium after the conversion of monomer to polymer has commenced.

The process of the present invention involves polymerizing with delayed initial addition of polymer molecular weight modifier a major portion of an olefinically unsaturated nitrile, such as acrylonitrile, and a minor portion of either an ester of an olefinically unsaturated carboxylic acid, such as ethyl acrylate, or a lower monoolefin, such as isobutylene, in an aqueous medium in the presence of a preformed diene rubber which is a homopolymer or copolymer of a conjugated diene monomer.

The conjugated diene monomers useful in the present invention include butadiene-1,3, isoprene, chloroprene, bromoprene, cyanoprene, 2,3-dimethylbutadiene-1,3, 2-ethyl-butadiene-1,3, 2,3-diethylbutadiene-1,3, and the like and others. More preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

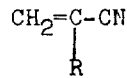

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acid useful in the present invention are preferably the lower alkyl esters of alpha,beta-olefinically unsaturated carboxylic acids, and more preferred are the esters having the structure

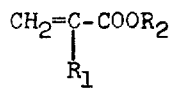

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloro acrylate, ethyl alpha-chloro acrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

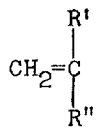

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The polymeric composition of the present invention can be prepared by any of the known general techniques of polymerization including bulk polymerization, solution polymerization, and emulsion or suspension polymerization techniques by batch, continuous or intermittent addition of the monomers. The preferred method is emulsion polymerization in an aqueous medium. The important point in the novel process of this invention is that the polymer molecular weight modifier or chain transfer agent is added for the first time to the polymerization reaction only after some conversion of monomer to polymer has occurred when the olefinically unsaturated nitrile, and optionally either an ester of an olefinically unsaturated carboxylic acid or lower alpha-olefin, is polymerized in the presence of a preformed rubbery polymer of a conjugated diene monomer. The polymerization is carried out preferably in an aqueous medium in the presence of an emulsifier and a free radical generating polymerization initiator at a temperature of from about 0° to 100°C in the substantial absence of molecular oxygen. The polymer chain modifier is added to the polymerization reaction only after from about 1 to 10% of the olefinic nitrile monomer, and optionally olefinically unsaturated carboxylic acid or alpha-olefin, is converted to polymer.

For the purpose of this invention the terms "chain transfer agent", "polymer molecular weight modifier", "polymer chain modifier", and "regulator" are used interchangeably. A true chain transfer agent is one which when included in a free radical polymerization reaction lowers the molecular weight of the polymer formed. Most commonly used chain transfer agents are long chain alkyl mercaptans. Chain transfer agents useful in the present invention include the primary, secondary, and tertiary alkyl mercaptans containing from 4 to 16 carbon atoms such as n-dodecyl mercaptan, t-dodecyl mercaptan, n-dodecyl thiolacetate, the tetra mercapto ester of pentaerythritol and betamercaptopropionic acid, limonene dimercaptan, n-octyl mercaptan, n-hexyl mercaptan, t-butyl benzene, toluene, isopropyl benzene, triphenyl methane, acetaldehyde, carbon tetrachloride, chloroform, and the like. Other chain transfer agents useful in this invention include the following:

naphthalene
acetone
1,1,3,3-tetramethyl-1-butanethiol
1,1,3,3,5,5,7,7-octamethyl-1-tetradecanethiol 1,1,3,3,5,5-hexamethyl-1-hexanethiol
dithio-diacetic acid diethyl ester
3-mercapto-acetophenone
p,p'-dithiodianisole
4-bromobenzenethiol
bis-(p-bromophenyl) disulfide
bis-(p-chlorophenyl) disulfide
bis-(dimethylthiocarbamoyl) disulfide
bis-(o-nitrophenyl) disulfide
2-mercapto-ethanol
ethyl disulfide
2-naphthalenethiol
phenyl disulfide
2-methyl propanethiol
sulfur
m-toluenethiol
p-tolyl disulfide
o,o'-dithiobis-aniline
4,4'-dithiobis-anthranilic acid
2-benzimidazolethiol
o-mercapto-benzoic acid
2,2'-dithiobis-benzothiazole
2-benzothiazolethiol
benzoyl disulfide
p,p'-dithiobis-benzyl alcohol
benzyl diselenide
butyl disulfide
dithiocarbonic acid
2,2'-dithiolepidine
4,4'-dithiomorpholine
3-mercapto-propionic acid
2,2'-dithiodiquinidine
hydrogen sulfide
acetyl disulfide
1-oxa-4,5-dithia cycloheptane
cumene
erythritol
xanthogen disulfide The polymer modifier or chain transfer agent should be used in from 0.01 to 3.0%, based on the weight of the finished resin.

For the purpose of this invention, the preferred polymer modifiers are the primary, secondary, and tertiary alkyl mercaptans containing from 4 to 16 carbon atoms, and particularly preferred are the organic mercapto compounds containing more than one mercapto group per molecule such as limonene dimercaptan and the tetra ester of pentaerythritol and beta-mercaptopropionic acid. The use of polymercapto polymer modifiers usually does not give better impact to the final resin but they are particularly preferred because the resulting resin is substantially odorless, whereas resin prepared with the alkyl mercaptans usually retains a mercaptan odor. It is essential that resin used for the packaging of foods be essentially odorless.

The resinous polymers prepared by the process of this invention are those resulting from the polymerization of 100 parts by weight of (A) at least 50% by weight of at least one nitrile having the structure

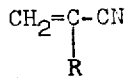

wherein R has the foregoing designation and (B) up to 50% by weight based on the combined weight of (A) and (B) of (1) an ester having the structure

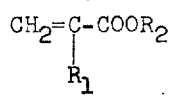

wherein $R_1$ and $R_2$ have the foregoing designations or (2) an alpha-olefin having the structure

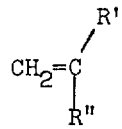

wherein R' and R'' have the foregoing designations in the presence of from 1 to 40 parts by weight of (C) a rubbery polymer of a conjugated diene monomer selected from the group consisting of butadiene and isoprene and optionally a comonomer selected from the group consisting of styrene and a nitrile monomer having the structure

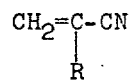

wherein R has the foregoing designation, said rubbery polymer containing from 50 to 100% by weight of polymerized conjugated diene and from 0 to 50% by weight of comonomer.

More specifically, this invention can be illustrated in a process for the polymerization, with delayed initial addition of polymer modifier, of a mixture of acrylonitrile and ethyl acrylate in the presence of a polymerization initiator or catalyst and in the presence of a preformed copolymer of butadiene-1,3 and acrylonitrile in latex form, and in the substantial absence of oxygen, to produce a product having excellent impact strength and exceptionally good impermeability to gases and vapors when exposed to said gases and vapors in the form of a film or thin sheet. Preferably, the acrylonitrile-ethyl acrylate monomer feed should contain at least 50% by weight of acrylonitrile based on the combined weight of acrylonitrile and ethyl acrylate; and more preferably, the acrylonitrile fed into the polymerization reaction should be on the order of from 60 to 90% by weight based on the combined weight of all of the acrylonitrile and ethyl acrylate used in the polymerization.

The rubbery conjugated diene polymer preferably contains more than 50% by weight of butadiene based on the total weight of combined butadiene and acrylonitrile; and more preferably, the rubbery copolymer of butadiene and acrylonitrile should contain from 50 to 90% and preferably 60 to 80% by weight of polymerized butadiene.

In the foregoing polymerization it is preferred that from about 1 to 40, and preferably 1 to 20, parts of the rubbery copolymer of butadiene and acrylonitrile be employed for each 100 parts of combined acrylonitrile and ethyl acrylate. It has generally been found that as the relative amount of the rubbery copolymer of butadiene and acrylonitrile is increased in the final polymeric product, the impact strength increases and the gas and barrier properties decrease somewhat. It is generally preferred to use just enough of the rubbery copolymer to impart the desired impact strength to the polymeric product and to retain the optimum gas and vapor barrier properties in the resinous polymeric product.

Polymerization initiators or catalysts which may be used in the polymerization of the monomers in the presence of the rubber include the per-acid catalysts such as persulfuric acid, peracetic acid, and perphthalic acid; the per-salt catalysts such as potassium persulfate; the peroxide catalysts such as hydrogen peroxide, benzoyl peroxide, chlorobenzoyl peroxide, bromobenzoyl peroxide, naphthyl peroxide, acetyl peroxide, benzoyl acetyl peroxide, lauryl peroxide, succinyl peroxide, di-t-butyl peroxide, dicumyl peroxide, cumyl hydroperoxide, t-butyl peracetate, sodium peroxide, barium peroxide; 2-alkyl hydroperoxides such as t-butyl hydroperoxide; azo catalysts such as azobisisobutyronitrile; and, if desired, mixtures of these polymerization initiators may be used. Radiation, such as ultraviolet radiation, x-rays, nuclear radiation, etc., may also be used for the initiation of the polymerization.

The polymerization can be carried to completion without substantial interruption or it may be stopped at any point short of completion. Incomplete polymerization may be used for the production of syrup which may be further worked and eventually substantially completely polymerized, unreacted polymerizable material may be separated from the polymer by any suitable method such as filtration, extraction, distillation, and the like. The polymerization may be carried out in any suitable type of apparatus and may be conducted in a batch, semi-continuous or continuous manner.

A particularly preferred method for the polymerization comprises an aqueous emulsion polymerization process wherein an aqueous emulsion of monomer is polymerized in admixture with an aqueous latex of the elastomer.

Emulsifying agents which may be used in the aqueous polymerization process include the soaps such as sodium and potassium myristate, laurate, palmitate, oleate, stearate, resinate, and hydroabietate; alkali metal alkyl and alkylene sulfonates such as sodium and potassium lauryl sulfate, cetyl sulfate, oleyl sulfonate, stearyl sulfonate, sulfonated castor oil, as well as ammonium salts thereof; salts of higher amines such as lauryl amine hydrochloride and stearyl amine hydrobromide; and higher molecular weight materials such as polyvinyl pyrrolidone, sodium polyacrylate, methyl cellulose, etc.

The product of the aqueous emulsion polymerization is usually a latex. The resin may be recovered from the latex by any suitable means such as by coagulation with electrolytes or solvents, by freezing, and the like.

Other materials, including plasticizers, stabilizers, lubricants, dyes, pigments, and fillers, may be added during the polymerization process, provided they do not chemically react with or otherwise adversely affect the ingredients of the polymerization reaction mixture. Otherwise, these additives may be added following the polymerization. Examples of other additives which may be included are wood flour, wood fibers, paper dust, clay, glass wool, glass fibers, mica, granite dust, silk floc, cotton floc, steel wool, cloth, sand, carbon black, titanium dioxide, zinc oxide, lead oxide, chrome yellow, gums, oils, waxes, and the like.

Other compounding ingredients, such as extenders, stabilizers, colors, and the like, may be used in preparing the compositions of this invention, as is well known in the art, so long as the balance between impact strength, flexural strength, tensile strength, processability, heat distortion temperature, and the like is not affected to such a degree that the composition is no longer useful as a tough, rigid thermoplastic material.

The resinous polymeric products of the process of this invention are thermoplastic materials which can be thermoformed into a wide variety of useful articles in any of the conventional ways employed with known thermoplastic polymeric materials, such as by extrusion, milling, molding, drawing, blowing, etc. The polymeric resins produced by the process of this invention have excellent solvent resistance and their impact strength and low permeability to vapors and gases make them very useful in the packaging industry, and they are particularly useful in the manufacture of bottles, film and other types of containers for liquids and solids.

In the following illustrative examples, the amounts of ingredients are expressed in parts by weight unless otherwise indicated.

EXAMPLE 1

A. A rubber latex was prepared by polymerizing with continuous agitation at 45°C in the substantial absence of oxygen a mixture of the following ingredients:

|  | Parts |
|---|---|
| acrylonitrile | 40 |
| butadiene-1,3 | 60 |
| *GAFC RE-610 (emulsifier) | 2.4 |
| azobisisobutyronitrile | 0.3 |
| t-dodecyl mercaptan | 0.5 |
| water | 200 |

*A mixture of $R-O-(CH_2CH_2O-)_nPO_3M_2$ and $[R-O-(CH_2CH_2O-)_n]_2PO_2M$ wherein $n$ is a number of from 1 to 40, R is an alkyl or alkaryl group and preferably a nonyl phenyl group and M is hydrogen, ammonia or an alkali metal, which composition is sold by the GAF Corporation.

Before the reaction was started the pH of the mixture was adjusted to about 8 with KOH. The polymerization was carried out for 22½ hours to a conversion of 92% and a total solids of 33.1%.

B. A thermoplastic resin was prepared by a process which is outside the scope of this invention but is included for the purpose of comparison from the following ingredients:

|  | Parts |
|---|---|
| acrylonitrile | 75 |
| methyl acrylate | 25 |
| latex A (above) | 10 (based on rubber solids) |
| potassium persulfate | 0.06 |
| dioctyl sodium sulfosuccinate | 0.85 |
| lecithin | 0.5 |
| *mercaptate Q-43 | 1.65 |

*The tetra ester of pentaerythritol and beta-mercapto-propionic acid having the formula

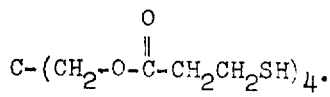

Initially, 0.05 part of mercaptate Q-43 was included in the polymerization mixture. The polymerization was carried out with agitation and in the substantial absence of oxygen at a temperature of 145°F. The remainder of the mercaptate Q-43 was added continuously during the period from about 6 to 25% conversion of the monomer to polymer. The polymerization was carried to 80% conversion and the final resin was isolated from the latex by coagulation with dilute aqueous aluminum sulfate and water washing. Some of the dried resin was compression molded into a test bar at 150°C and 4,000 psi. The test bar was found to have a notched Izod impact strength of 1.3 foot pounds per inch of notch. This resin was found to have a Brabender torque of 1,400 meter grams. The Brabender torque test involves determining the torque in mixing 55 grams of material after 15 minutes at 35 RPM and 235°C in the Brabender mixer with a standard mixing head. Brabender torque is an indication of the processability (molecular weight) of a given thermoplastic resin.

C. Procedure B above was repeated to prepare a thermoplastic resin within the scope of this invention except that no mercaptate Q-43 was added initially to the polymerization mixture. The mercaptate Q-43 was added continuously between about 6% and 25% conversion of monomer to polymer. The resulting resin was found to have a notched Izod impact strength of 7.7 foot pounds per inch of notch and a Brabender torque of 2,090 meter grams.

EXAMPLE 2

A. An elastomer latex was prepared according to the procedure of Example 1-A with the exception that 35 parts of acrylonitrile and 65 parts of butadiene were used.

B. A thermoplastic resin which is outside the scope of this invention and serves as a control experiment was prepared using the following ingredients:

|  | Parts |
| --- | --- |
| methacrylonitrile | 95 |
| methyl methacrylate | 5 |
| GAFAC RE-610 | 3.0 |
| t-butyl peroxypivalate | 0.5 |
| elastomer latex A (above) | 25 (solid rubber basis) |
| *d-limonene dimercaptan | 0.9 |

*Primarily composed of

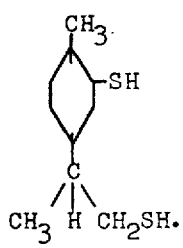

The polymerization was carried out with continuous agitation in the substantial absence of oxygen at a temperature of 140°F to 85% conversion. Initially, 0.15 part of the d-limonene dimercaptan was included in the polymerization mixture and the remainder was added continuously during the period of from 0 to 40% conversion. The resin was isolated and was found to have a notched Izod impact strength of 3.0 foot pounds per inch of notch and a Brabender torque of 1,850 meter grams.

C. A thermoplastic resin within the scope of this invention was prepared as in B above except that no d-limonene dimercaptan was included in the initial polymerization recipe but all of it was added continuously during the period of from about 10 to 40% conversion. The final resin was found to have a notched Izod impact strength of 6.3 foot pounds per inch of notch and a Brabender torque of 2,320 meter grams.

EXAMPLE 3

A. The procedure of Example 2-B was repeated with the exception that 15 parts of rubber were employed instead of 25 parts. The final resin was found to have a notched Izod impact strength of 1.25 foot pounds per inch of notch and a Brabender torque of 1,630 meter grams.

B. The procedure of Example 2-C was repeated except that 15 parts of rubber were used in the polymerization mixture. The final resin was found to have a notched Izod impact strength of 1.76 foot pounds per inch of notch and a Brabender torque of 1,650 meter grams.

EXAMPLE 4

A. A butadiene-acrylonitrile copolymer elastomer was prepared from the following recipe in the substantial absence of oxygen to high conversion at 122°F with agitation:

|  | Parts |
| --- | --- |
| water | 200 |
| butadiene | 65 |
| acrylonitrile | 35 |
| fatty acid | 0.663 |
| KOH | 0.176 |
| potassium rosin acid soap | 0.632 |
| lecithin | 0.4 |
| t-dodecyl mercaptan | 0.92 |
| azobisisobutyronitrile | 0.50 |

B. A thermoplastic resin which is outside the scope of this invention was prepared from the following ingredients:

|  | Parts |
| --- | --- |
| water | 235 |
| acrylonitrile | 80 |
| isobutylene | 20 |
| elastomer A (solids basis) | 13 |
| dioctyle sodium sulfosuccinate | 1.0 |
| lecithin | 0.5 |
| potassium persulfate | 0.3 |
| mercaptate Q-43 | 2.0 |

The polymerization was carried out at a temperature of 140°F. 0.33 part of Q-43 was initially present in the polymerization mixture and the remainder was added from the start of the reaction up to about 48% conversion of monomer to polymer. The final resin was found to have a notched Izod impact strength of 0.4 foot pound per inch of notch and a Brabender torque of 1,560 meter grams.

C. A repeat of B above, which is within the scope of this invention, was carried out under the same conditions described in B except that none of the mercaptate Q-43 was added to the recipe until the polymerization reaction had reached about 10% conversion, at which time the mercaptate Q-43 was added during the period of from about 10 to 34% conversion. The final resin was found to have a notched Izod impact strength of 1.1 foot pounds per inch of notch and a Brabender torque of 1,770 meter grams.

We claim:

1. In the process for preparing an impact-resistant resinous polymer comprising polymerizing in an aqueous medium in the substantial absence of oxygen and in the presence of a polymerization initiator and a polymer modifier 100 parts by weight of
   A. at least 50% by weight of at least one nitrile having the structure

wherein R is hydrogen, a lower alkyl group having from 1 to 4 carbon atoms or a halogen and
   B. up to 50% by weight based on the combined weight of (A) and (B) of
      1. an ester having the structure

wherein $R_1$ is hydrogen, an alkyl group having from 1 to 4 carbon atoms, or a halogen, and $R_2$ is an alkyl group having from 1 to 6 carbon atoms, or
      2. an alpha-olefin having the structure

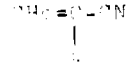

wherein R' and R'' are alkyl groups having from 1 to 7 carbon atoms in the presence of from 1 to 40 parts by weight of
   C. a rubbery polymer of a conjugated diene and a comonomer having the structure $$CH_2=C-CN$$

wherein R has the foregoing designation, said rubbery polymer containing from 50 to 90% by weight of polymerized conjugated diene and from 10 to 50% by weight of comonomer,
   the improvement consisting of carrying the polymerization reaction to at least about 5% conversion before adding any of the polymer modifier.

2. The process of claim 1 wherein the nitrile is acrylonitrile or methacrylonitrile.

3. The process of claim 2 wherein the ester is methyl acrylate or methyl methacrylate.

4. The process of claim 3 wherein the conjugated diene is butadiene.

5. The process of claim 4 wherein the polymer modifier is a member selected from the group consisting of primary, secondary, and tertiary alkyl mercaptans containing from 4 to 16 carbon atoms, limonene dimercaptan and the tetra ester of pentaerythritol and beta-mercapto-propionic acid.

* * * * *